United States Patent
Lin

(10) Patent No.: US 12,306,661 B2
(45) Date of Patent: May 20, 2025

(54) APPARATUS AND METHOD OF POWER EFFICIENT HIGH-SPEED CLOCK TRANSMISSION

(71) Applicant: Realtek Semiconductor Corp., Hsinchu (TW)

(72) Inventor: Chia-Liang (Leon) Lin, Fremont, CA (US)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 169 days.

(21) Appl. No.: 18/454,973

(22) Filed: Aug. 24, 2023

(65) Prior Publication Data

US 2025/0068208 A1    Feb. 27, 2025

(51) Int. Cl.
*G06F 1/08* (2006.01)
*G06F 1/10* (2006.01)

(52) U.S. Cl.
CPC . *G06F 1/08* (2013.01); *G06F 1/10* (2013.01)

(58) Field of Classification Search
CPC ................. G06F 1/08; G06F 1/10; H04L 7/00
See application file for complete search history.

(56) References Cited

U.S. PATENT DOCUMENTS

| | | | |
|---|---|---|---|
| 11,269,371 B1* | 3/2022 | Elabd | H04L 7/0008 |
| 11,894,776 B2* | 2/2024 | Saha | H02M 3/33571 |
| 2015/0310980 A1* | 10/2015 | Yen | H01F 5/00 336/200 |

* cited by examiner

*Primary Examiner* — Raymond N Phan
(74) *Attorney, Agent, or Firm* — McClure, Qualey & Rodack, LLP

(57) ABSTRACT

A clock transmission circuit includes a voltage-to-current converter configured to convert a first clock into a first current; a transmission line configured to convey the first current into a second current; a transformer comprising a primary inductor and a secondary inductor and configured to convert the second current received via the primary inductor into a second clock output via the secondary inductor; a tuning capacitor configured to form a resonance with the secondary inductor; and a regenerative network connected to the secondary inductor and configured to provide a negative resistance to reinforce the resonance.

20 Claims, 3 Drawing Sheets

APPARATUS AND METHOD OF POWER EFFICIENT HIGH-SPEED CLOCK TRANSMISSION

BACKGROUND OF THE DISCLOSURE

Field of the Disclosure

The present disclosure generally relates to clock transmission, and particularly relates to power-efficient high-speed clock transmission.

Description of Related Art

A clock is a voltage signal that oscillates between a low level and a high level. Clocks are widely used in synchronous digital circuits for coordinating actions of said synchronous digital circuits. An integrated circuit that contains a plurality of synchronous digital circuits usually has a clock generation circuit, e.g., a phase lock loop, configured to generates a clock, which usually needs to be transmitted through a transmission line to said plurality of synchronous digital circuits to coordinate actions thereof. In a case where the clock generation circuit and a synchronous digital circuit that needs to receive the clock from the clock generation circuit are physically separated by a long distance, the transmission of the clock might be challenging. The-long distance transmission of the clock usually suffers a large loss, resulting in a weak signal on the receiving end. The problem worsens when the clock is a high-speed clock since an insertion loss of a transmission line increases as a frequency of the transmitted signal increases. In some cases, on the receiving end, there are a plurality of local circuits that need the clock but are physically separated to a lesser extent.

In U.S. Pat. No. 11,269,371, a clock transmission circuit is disclosed, wherein a current buffer is used to offer a low impedance at the end of a transmission line to enable a current-mode clock transmission. The clock transmission circuit disclosed therein can effectively alleviate the insertion loss of the transmission line, but the current buffer must consume considerable power to offer a low impedance.

What is desired is a method for transmitting a high-speed clock over a long transmission line in a power efficient manner.

BRIEF DESCRIPTION OF THIS DISCLOSURE

An objective of this present invention is to have a clock transmission circuit that can transmit, in a power efficient manner, a high-speed clock from a remote transmitter to a local receiver via a transmission line without suffering a large insertion loss from the transmission line.

Another objective of this present invention is to have a clock transmission circuit that can transmit, in a power efficient manner, a high-speed clock from a remote transmitter to a plurality of local receives via a transmission line and a plurality of capacitively driven wires without suffering a large insertion loss of the transmission line.

In an embodiment, a clock transmission circuit comprises: a voltage-to-current converter configured to convert a first clock into a first current; a transmission line configured to convey the first current into a second current; a transformer comprising a primary inductor and a secondary inductor and configured to convert the second current received via the primary inductor into a second clock output via the secondary inductor; a tuning capacitor configured to form a resonant network with the secondary inductor; and a regenerative network connected to the resonant network and configured to provide a negative resistance to enhance resonance of the resonant network. In a further embodiment, the clock transmission circuit further comprises: a first capacitively driven wire configured to drive the second clock into a third clock; and a first self-based inverter configured to receive the third clock and output a fourth clock. In a yet further embodiment, the clock transmission circuit further comprises: a second capacitively driven wire configured to drive the second clock into a fifth clock; and a second self-based inverter configured to receive the fifth clock and output a sixth clock.

In an embodiment, a method of clock transmission comprises: converting a first clock into a first current using a voltage-to-current converter; conveying the first current into a second current using a main transmission line; using a transformer comprising a primary inductor and a secondary inductor to transform the second current received via the primary inductor into a second clock output via the secondary inductor; using a tuning capacitor to resonate with the secondary inductor; and reinforcing the resonance using a regenerative network. In an embodiment, the method of clock transmission further comprises: conveying the second clock into a third clock using a first capacitively driven wire; amplifying the third clock into a fourth clock using a first self-biased inverter; conveying the second clock into a fifth clock using a second capacitively driven wire; and amplifying the fifth clock into a sixth clock using a second self-biased inverter.

DETAILED DESCRIPTION OF THIS DISCLOSURE

Figure 1:
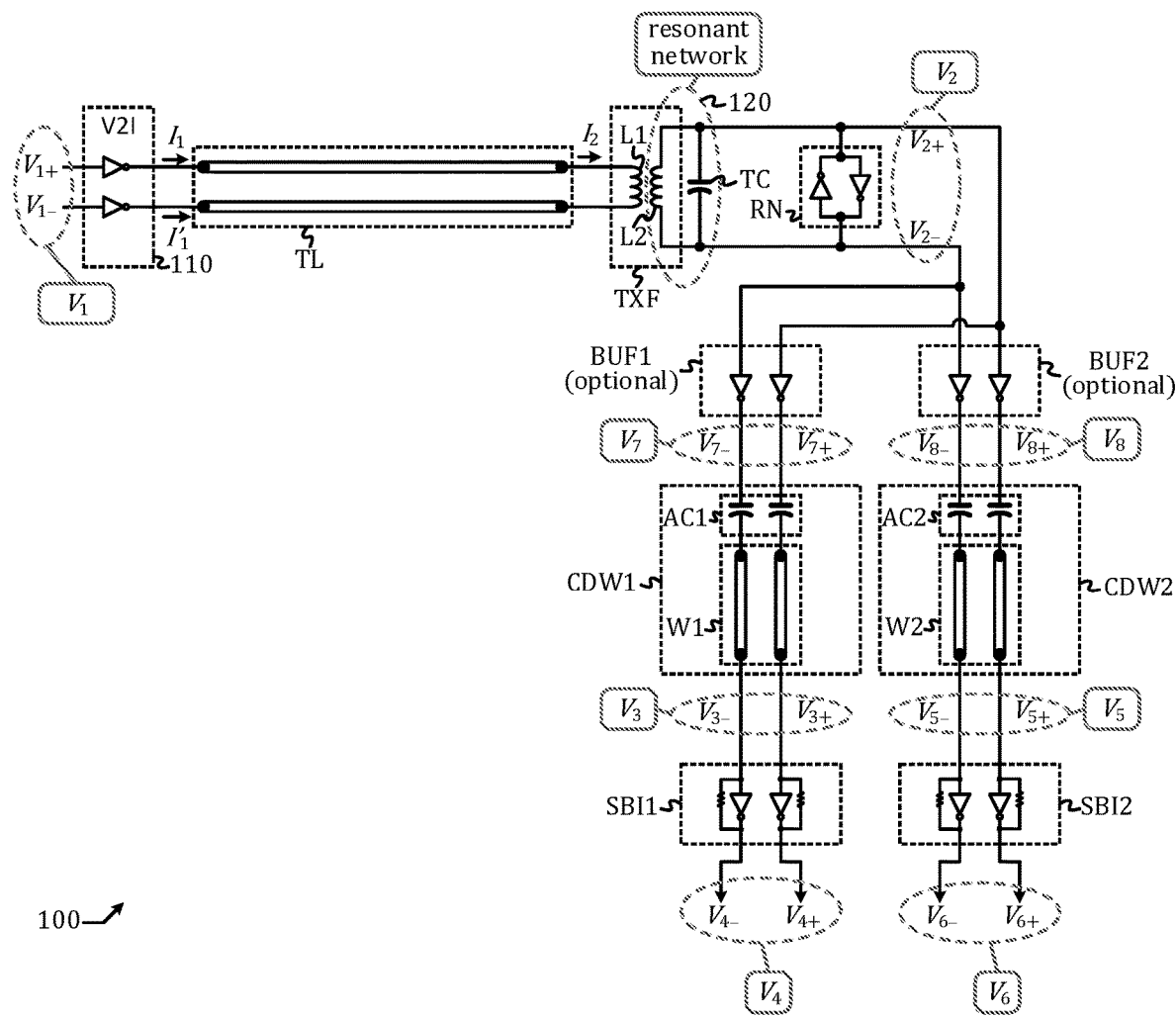
FIG. 1 shows a schematic diagram of a clock transmission circuit in accordance with an embodiment of the present invention.

The present disclosure is directed to clock transmission. While the specification describes several example embodiments of the disclosure considered favorable modes of practicing the invention, it should be understood that the invention can be implemented in many ways and is not limited to the particular examples described below or to the particular manner in which any features of such examples are implemented. In other instances, well-known details are not shown or described to avoid obscuring aspects of the disclosure.

Persons of ordinary skill in the art understand terms and basic concepts related to microelectronics that are used in this disclosure, such as "voltage," "current," "clock," "transmission line," "transformer," "capacitor," "inductor," "resistor," "resonance," "resonant network," "frequency," "impedance," "via," "inverter," "AC (alternate current)," "AC couple," and "cross-coupling." Terms like these are used in a context of microelectronics, and the associated concepts are apparent to those of ordinary skills in the art and thus will not be explained in detail here.

Those of ordinary skill in the art can recognize a capacitor symbol, an inductor symbol, an inverter symbol, and a transmission line symbol. Those of ordinary skills in the art can read schematics of a circuit comprising components and devices such as capacitors, inductors, resistors, inverters, and so on, and do not need a verbose description about how one component connects with another in the schematics.

This present disclosure is disclosed in terms of an engineering sense. For instance, regarding two variables X and Y, when it is said that "X is equal to Y," it means that "X is approximately equal to Y," i.e., "a difference between X and Y is smaller than a specified engineering tolerance." When it is said that "X is zero," it means that "X is approximately zero," i.e. "X is smaller than a specified engineering tolerance." When it is said that "X is substantially smaller than Y," it means that "X is negligible with respect to Y," i.e. "a ratio between X and Y is smaller than an engineering tolerance and therefore X is negligible when compared to Y."

In this present disclosure, a signal is a voltage of a variable level that carry a certain information and can vary with time. A level of the signal at a given moment represents a state of the signal at that moment.

A logical signal is a signal of two states: a low state and a high state. The low state is also referred to as a "0" state, while the high stage is also referred to as a "1" state. Regarding a logical signal Q, "Q is high" or "Q is low," means that "Q is in the high state" or "Q is in the low state." Likewise, "Q is 1" or "Q is 0," means that "Q is in the 1 state" or "Q is in the 0 state."

When a logical signal toggles from low to high, it undergoes a low-to-high transition. When a logical signal toggles from high to low, it undergoes a high-to-low transition.

A first logical signal is said to be a logical inversion of a second logical signal if the first logical signal and the second logical signal are always in opposite states. That is, when the first logical signal is 0 (or low), the second logical signal is 1 (or high); when the first logical signal is 1 (or high), the second logical signal is 0 (high). When a first logical signal is a logical inversion of a second logical signal, the first logical signal and the second logical signal are said to be complementary to one another.

A clock is a logical signal that cyclically toggles back and forth between a low state and a high state.

A circuit is a collection of a transistor, a resistor, an inductor, a capacitor, and/or other electronic devices interconnected in a certain manner to embody a certain function.

An inductor comprises an electrical conduction path usually embodied by a metal wire (or trace) that allows a current to flow through and excite a magnetic field. An inductor is often embodied by a metal wire (or trace) configured in a loop topology with two open ends including a first end and a second end, wherein a current can flow from the first end to the second end.

An inverter is a circuit configured to receive an input signal and output an output signal so that the output signal is an inversion of the input signal. An inverter can be used an amplifier, as it can make the output signal have a larger swing and/or a sharper transition than the input signal. An inverter can also be used as a voltage-to-current converter when its output connects to a low-impedance node; in this case, what matters is the output current, not the output voltage.

A "self-biased inverter" is an inverter with a feedback resistor connected between its input and its output, thus forming negative feedback and establishing a DC (direct current) voltage of the input and the output signals.

In this disclosure, a "buffer" is circuit configured to receive an input signal and output an output signal such that the output signal is either logically the same as the input signal (for a noninverting buffer) or logically an inversion of the input signal (for an inverting buffer) but has either a larger swing or a sharper transition. In inverter can be used as an inverting buffer.

Throughout this disclosure, a differential signaling scheme is widely used. When embodied in a differential signaling scheme, a signal comprises two voltages denoted with suffixes "+" and "−," respectively, attached in subscript, and the two voltages are complementary. For instance, a signal $V_x$ in a differential signaling embodiment comprises two voltages $V_{x+}$ and $V_{x-}$, wherein $V_{x+}$ and $V_{x-}$ are complementary to one another.

A schematic diagram of a clock transmission circuit 100 in accordance with an embodiment of the present invention is shown in FIG. 1. The clock transmission circuit 100 comprises: a voltage-to-current converter (V2I) 110 configured to convert a first clock $V_1$ (comprising two voltages $V_{1+}$ and $V_{1-}$) output from a transmitter (not shown in the figure) into a first current $I_1$; a main transmission line TL configured to convey the first current $I_1$ into a second current $I_2$; a transformer TXF comprising a primary inductor L1 and a secondary inductor L2 configured to transform the second current $I_2$ received via the primary inductor L1 into a second clock $V_2$ (comprising two voltages $V_{2+}$ and $V_{2-}$) output via the secondary inductor L2; a tuning capacitor TC connected in parallel with the secondary inductor L2 to form a resonant network 120; and a regenerative network RN connected to the resonant network 120. The second clock $V_2$ is an output clock that can be used by an abutting subsequent circuit (not shown in the figure).

In a further embodiment wherein the second clock $V_2$ needs to be delivered to a first local receiver, the clock transmission circuit 100 further comprises: a first capacitively driven wire CDW1 configured to receive the second clock $V_2$, either directly or indirectly via a first optional buffer BUF1, and output a third clock $V_3$ (comprising two voltages $V_{3+}$ and $V_{3-}$); and a first self-biased inverter SBI1 configured to receive the third clock $V_3$ and output a fourth clock $V_4$ (comprising two voltages $V_{4+}$ and $V_{4-}$).

In a yet further embodiment wherein the second clock $V_2$ also needs to be delivered to a second local receiver, the clock transmission circuit 100 further comprises: a second capacitively driven wire CDW2 configured to receive the second clock $V_2$, either directly or indirectly via a second optional buffer BUF2, and output a fifth clock $V_5$ (comprising two voltages $V_{5+}$ and $V_{5-}$); and a second self-biased inverter SBI2 configured to receive the fifth clock $V_5$ and output a sixth clock $V_6$ (comprising two voltages $V_{6+}$ and $V_{6-}$).

The $V_2I$ 110 performs a voltage-to-current conversion function and by way of example but not limitation is embodied by two inverters, one receiving $V_{1+}$ and outputting $I_1$, the other receiving $V_{1-}$ and outputting $I'_1$, which is an inversion of $I_1$ and thus complementary to $I_1$. Here, a current-mode transmission scheme is employed, wherein the transformer TXF presents a low impedance at the end of the main transmission line TL to allow the first current $I_1$ to propagate into the second current signal $I_2$ and flow in the primary inductor L1 with ease. The current-mode transmission scheme offers an advantage of low loss, as insertion loss from the main transmission line TL mostly results in voltage drop (instead of current loss), which is not an issue in a current-mode transmission scenario because what matters is current, but not voltage. The main transmission line TL is said to convey the first current $I_1$ into the second current $I_2$, because the main transmission line TL provides a conduction path for the first current $I_1$ to flow through and eventually become the second current $I_2$ with a modest loss.

In an embodiment, the primary inductor L1 and the secondary inductor L2 are both spiral inductors laid out in a co-located manner (for instance, stacked or interleaved) in a very close proximity to have a strong mutual coupling. To enable the transformer TXF to present a low impedance (looking into the primary inductor L1 at the end of the main transmission line TL), a number of turns of the secondary inductor L2 is greater than a number of turns of the primary inductor L1.

In an embodiment, the clock transmission circuit 100 is integrated and fabricated on a substrate using a multi-layer process technology including a first metal layer M1, a second metal layer M2, and a "via" layer configured to provide inter-metal-layer connection between the first metal layer M1 and a second metal layer M2. In an embodiment, by way of example but not limitation, the primary inductor L1 is a single-turn inductor, the secondary inductor L2 is a two-turn inductor, and an impedance transformation ratio of the transformer TXF is approximately 1:4.

Figure 2:
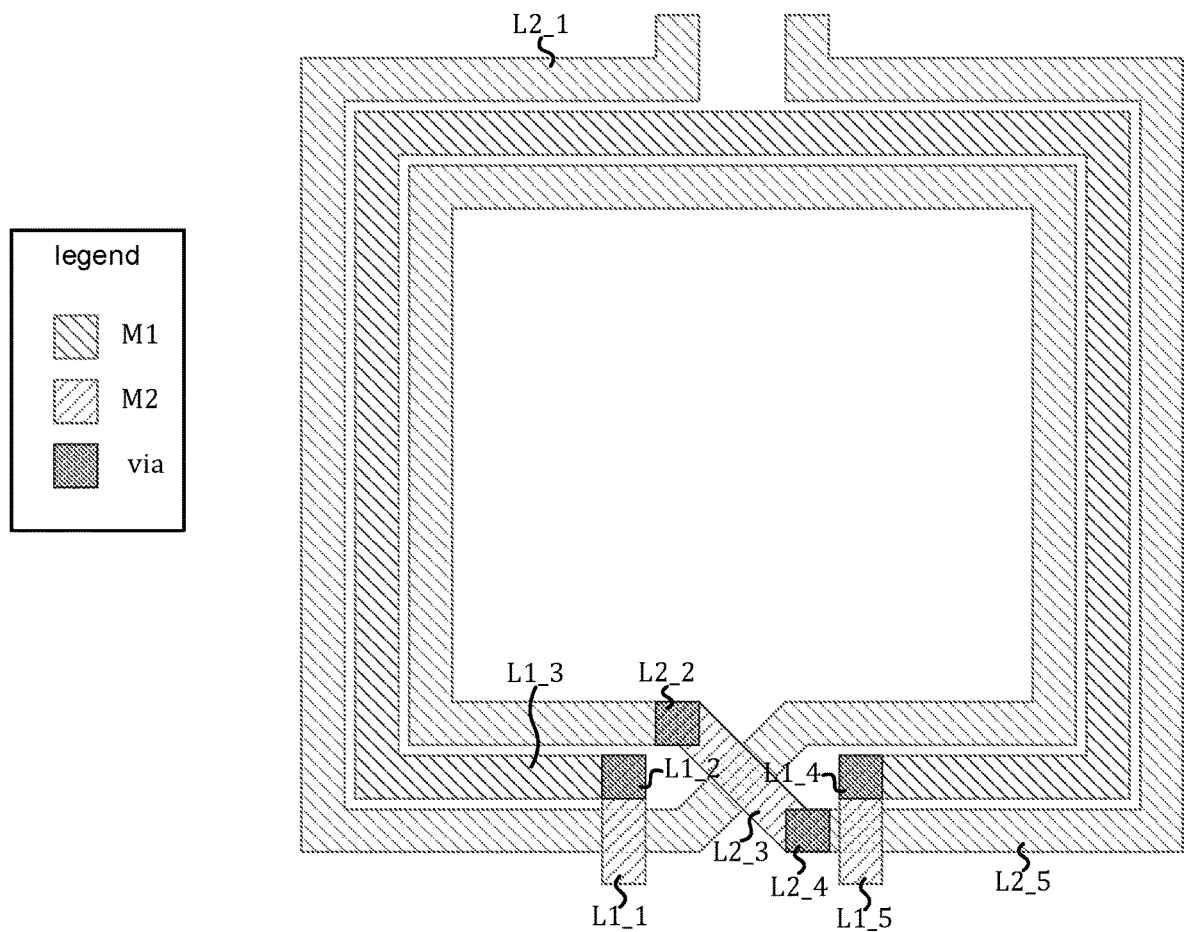
FIG. 2 shows a top view of a layout of a transformer used in the clock transmission circuit of FIG. 1 in accordance with an embodiment of the present invention.

A top view of a layout of the transformer TXF in accordance with an embodiment of the present invention is shown in FIG. 2. As shown, the primary inductor L1 includes: a left leg L1_1 laid out on M2; a left via L1_2; a single-turn loop L1_3 laid out on M1; a right via L1_4; and a right leg L1_5 laid out on M2. The secondary inductor L2 includes: a one-and-half turn loop L2_1 laid out on M1; an upper via L2_2; a crossing trace L2_3 laid out on M2; a lower via L2_4; and a half-turn loop L2_5 laid out on M1. It is clear that the primary inductor L1 is of single turn, the secondary inductor is of two turns, and there is a strong coupling the between the primary inductor L1 and the secondary inductor L2 due to being laid out in a co-located manner with an interleaving topology.

In an alternative embodiment (not shown in figure, but can be well understood by those of ordinary skill in the art), the primary inductor L1 and the secondary inductor L2 are laid out in a stacked topology, wherein a part of the secondary inductor L2 is laid out on M2 and stacked upon a part of the primary inductor L1 that is laid out on M1. Both "interleaving" and "stacked" topologies are used in the prior art for implementing a transformer and thus not further explained here.

The tuning capacitor TC is used to resonate with the secondary inductor L2 at a resonant frequency approximately equal to a frequency of the second clock $V_2$ (which is the same as a frequency of the first clock $V_1$) so that the second clock $V_2$ can have a large swing due to the resonance. The regenerative network RN provides a negative resistance to enhance the resonance between the secondary inductor L2 and the tuning capacitor TC to further boost the swing of the second clock $V_2$. In an embodiment, the regenerative network RN comprises two cross-coupling inverters, which establish positive feedback that is regenerative in nature. Those of ordinary skill in the art understand concept of cross-coupling inverters and why it is regenerative and can form a negative resistance; therefore, it is not explained in detail here.

The first buffer BUF1, which is optional and comprises two inverters, is used to amplify the second clock $V_2$ into a seventh clock $V_7$ (comprising two voltages $V_{7+}$ and $V_{7-}$). The second buffer BUF2, which is also optional and comprise two inverters, is used to amplify the second clock $V_2$ into an eighth clock $V_8$ (comprising two voltages $V_{8+}$ and $V_{8-}$). When the first buffer BUF1 is opted out, the seventh clock $V_7$ will be the same as the second clock $V_2$. When the second buffer BUF2 is opted out, the eighth clock $V_8$ will be the same as the second clock $V_2$. A purpose of the first buffer BUF1 (second buffer BUF2) is to provide isolation to avoid loading from the first (second) capacitively driven wire CDW1 (CDW2) to the resonant network 120.

The first capacitively driven wire CDW1 comprises a first AC (alternate current) coupling capacitor AC1 and a first wire W1, which is a local transmission line shorter than the main transmission line TL. The second capacitively driven wire CDW2 comprises a second AC coupling capacitor AC2 and a second wire W2, which is also a local transmission line shorter than the main transmission line TL. The AC coupling capacitor AC1 (AC2) serves two purposes: first, to provide isolation of DC (direct current) voltage and thus allow the subsequent circuit SBI1 (SBI2) to establish DC voltage on its own; second, to alleviate a capacitive loading of the first W1 (the second wire W2) to the preceding circuit, i.e., BUF1 (BUF2) if BUF1 (BUF2) is opted in, or the resonant network 120 if BUF1 (BUF2) is opted out.

The first self-biased inverter SBI1 comprises two inverters and two feedback resistors inserted between their respective inputs and respective outputs. Likewise, the second self-biased inverter SBI2 comprises two inverters and two feedback resistors inserted between their respective inputs and respective outputs. Both the first self-based inverter SBI1 and the second self-biased inverter SBI2 are well understood by those of ordinary skill in the art and thus not described in detail here.

There are a few advantages of the clock transmission circuit 100. First, by using the transformer TXF that exhibits a low impedance at the end of the main transmission line TL to make it easier for the second current $I_2$ to flow in, a current-mode transmission is established, and insertion loss of the main transmission line TL is alleviated, for the insertion loss of the main transmission line TL mainly causes voltage drop as opposed to current loss. This way, the main transmission line TL is said to be conveying the first current $I_1$ into the second current $I_2$. Unlike the prior art clock transmission line circuit disclosed in U.S. Pat. No. 11,269,371, however, the clock transmission circuit 100 does not use a current buffer to realize a low impedance and thus does not need to consume considerable power. Second, by making a number of turns of the secondary inductor L2 greater than a number of turns of the primary inductor L1, we make it easier for the second clock $V_2$ to have a large swing. Third, the transformer TXF inherently provides DC isolation between the $V_2I$ 110 and the resonant network 120, thus allowing the $V_2I$ 110 and the resonant network 120 to establish DC level independently.

Figure 3:
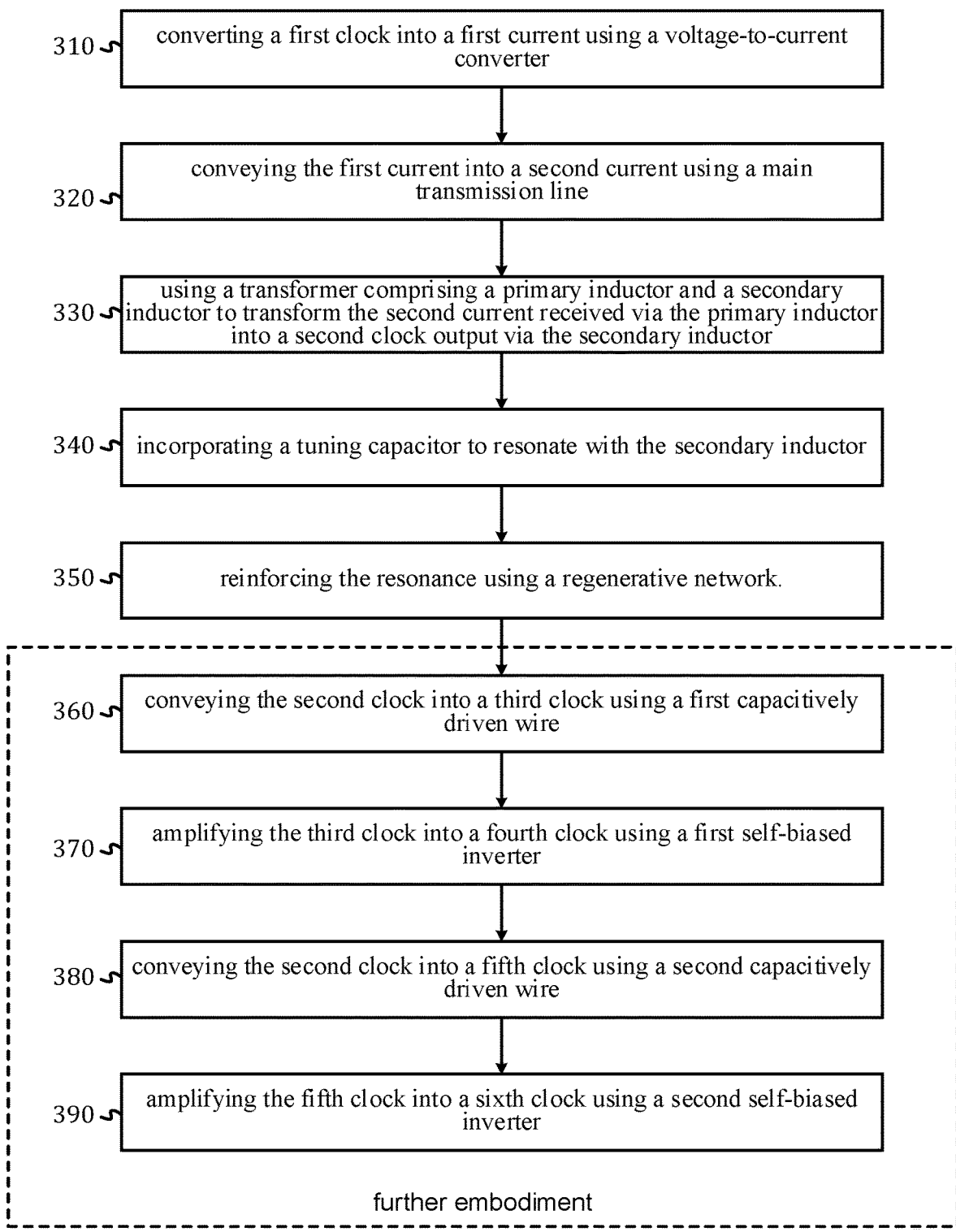
FIG. 3 shows a spreadsheet of a method of clock transmission, in accordance with the present invention.

As illustrated by a flow diagram in FIG. 3, in accordance with an embodiment of this present invention, a method of clock transmission comprises: (step 310) converting a first clock into a first current using a voltage-to-current converter; (step 320) conveying the first current into a second current using a transmission line; (step 330) using a transformer comprising a primary inductor and a secondary inductor to transform the second current received via the primary inductor into a second clock output via the secondary inductor; (step 340) incorporating a tuning capacitor to resonate with the secondary inductor; (step 350) reinforcing the resonance using a regenerative network. In a further embodiment, the method further includes: (step 360) conveying the second clock into a third clock using a first capacitively driven wire; (step 370) amplifying the third clock into a fourth clock using a first self-biased inverter;

(step 380) conveying the second clock into a fifth clock using a second capacitively driven wire; and (step 390) amplifying the fifth clock into a sixth clock using a second self-biased inverter.

Those skilled in the art will readily observe that numerous modifications and alterations of the device and method may be made while retaining the teachings of the disclosure. Accordingly, the above disclosure should not be construed as limited only by the metes and bounds of the appended claims.

What is claimed is:

1. A clock transmission circuit comprising:
   a voltage-to-current converter configured to convert a first clock into a first current;
   a main transmission line configured to convey the first current into a second current;
   a transformer comprising a primary inductor and a secondary inductor and configured to convert the second current received via the primary inductor into a second clock output via the secondary inductor;
   a tuning capacitor configured to form a resonant network with the secondary inductor; and
   a regenerative network connected to the resonant network and configured to provide a negative resistance to enhance resonance of the resonant network.

2. The clock transmission circuit of claim 1 being integrated and fabricated on a substrate using a multi-layer process technology comprising a first metal layer, a second metal layer, and a via layer configured to provide inter-metal-layer connection between the first metal layer and the second metal layer.

3. The clock transmission circuit of claim 1, wherein the voltage-to-current converter comprises an inverter.

4. The clock transmission circuit of claim 1, wherein the regenerative network comprises two cross-coupling inverters.

5. The clock transmission circuit of claim 2, wherein both the primary inductor and the secondary inductor are of spiral topology and a number of turns of the secondary inductor is larger than a number of turns of the primary inductor.

6. The clock transmission circuit of claim 5, wherein the primary inductor is of single turn and the secondary inductor is of two turns.

7. The clock transmission circuit of claim 5, wherein the primary inductor and the secondary inductor are laid out in an interleaving topology comprising a combination of metal traces laid out on the first metal layer and the second metal layer.

8. The clock transmission circuit of claim 5, wherein the primary inductor and the secondary inductor are laid out in a stacked topology comprising a combination of metal traces laid out on the first metal layer and the second metal layer.

9. The clock transmission circuit of claim 5, further comprising a first capacitively driven wire configured to receive the second clock, either directly or indirectly via a first buffer, and output a third clock, and a first self-biased inverter configured to receive the third clock and output a fourth clock, wherein the first capacitively driven wire comprises a first AC (alternate current) coupling capacitor and a first wire that is a first local transmission line shorter than the main transmission line.

10. The clock transmission circuit of claim 9, further comprising a second capacitively driven wire configured to receive the second clock, either directly or indirectly via a second buffer, and output a fifth clock, and a second self-biased inverter configured to receive the fifth clock and output a sixth clock, wherein the second capacitively driven wire comprises a second AC coupling capacitor and a second wire that is a second local transmission line shorter than the main transmission line.

11. A method of clock transmission comprising:
   converting a first clock into a first current using a voltage-to-current converter;
   conveying the first current into a second current using a main transmission line;
   using a transformer comprising a primary inductor and a secondary inductor to transform the second current received via the primary inductor into a second clock output via the secondary inductor;
   using a tuning capacitor to resonate with the secondary inductor; and
   reinforcing the resonance using a regenerative network.

12. The method of clock transmission of claim 11, further comprising integrating and fabricating the voltage-to-current converter, the main transmission line, the transformer, the tuning capacitor and the regenerative network on a substrate using a multi-layer process technology comprising a first metal layer, a second metal layer, and a via layer configured to provide inter-metal-layer connection between the first metal layer and the second metal layer.

13. The method of clock transmission of claim 11, wherein the voltage-to-current converter comprises an inverter.

14. The method of clock transmission of claim 11, wherein the regenerative network comprises two cross-coupling inverters.

15. The method of clock transmission of claim 12, wherein both the primary inductor and the secondary inductor are of spiral topology and a number of turns of the secondary inductor is larger than a number of turns of the primary inductor.

16. The method of clock transmission of claim 15, wherein the primary inductor is of single turn and the secondary inductor is of two turns.

17. The method of clock transmission of claim 15, wherein the primary inductor and the secondary inductor are laid out in an interleaving topology comprising a combination of metal traces laid out on the first metal layer and the second metal layer.

18. The method of clock transmission of claim 15, wherein the primary inductor and the secondary inductor are laid out in a stacked topology comprising a combination of metal traces laid out on the first metal layer and the second metal layer.

19. The method of clock transmission of claim 15, further comprising incorporating a first capacitively driven wire configured to receive the second clock, either directly or indirectly via a first buffer, and output a third clock, and a first self-biased inverter configured to receive the third clock and output a fourth clock, wherein the first capacitively driven wire comprises a first AC (alternate current) coupling capacitor and a first wire that is a first local transmission line shorter than the main transmission line.

20. The method of clock transmission of claim 19, further comprising incorporating a second capacitively driven wire configured to receive the second clock, either directly or indirectly via a second buffer, and output a fifth clock, and a second self-biased inverter configured to receive the fifth clock and output a sixth clock, wherein the second capacitively driven wire comprises a second AC coupling capacitor and a second wire that is a second local transmission line shorter than the main transmission line.

* * * * *